United States Patent [19]
Lambertz et al.

[11] Patent Number: 4,652,407
[45] Date of Patent: Mar. 24, 1987

[54] GAS COOLING AND WASHING APPARATUS

[75] Inventors: Johannes Lambertz, Kerpen; Sievernich Mathias, Weilerswist, both of Fed. Rep. of Germany

[73] Assignee: Rheinische Braunkohlenwerke AG., Cologne, Fed. Rep. of Germany

[21] Appl. No.: 777,907

[22] Filed: Sep. 19, 1985

[30] Foreign Application Priority Data

Sep. 22, 1984 [DE] Fed. Rep. of Germany ....... 3434866

[51] Int. Cl.$^4$ ............................................. B01D 47/10
[52] U.S. Cl. ...................................... 261/112; 55/240; 55/241; 261/DIG. 54
[58] Field of Search ........ 261/112, DIG. 54, DIG. 9; 138/37; 55/240, 241

[56] References Cited

U.S. PATENT DOCUMENTS

| | | | |
|---|---|---|---|
| 3,009,687 | 11/1961 | Hendriks | 261/DIG. 54 |
| 3,112,352 | 11/1963 | Krantz | 261/DIG. 54 |
| 3,138,441 | 6/1964 | Krantz | 261/DIG. 54 |
| 3,138,442 | 6/1964 | Krantz | 261/DIG. 54 |
| 3,138,647 | 6/1964 | Krantz | 261/DIG. 54 |
| 3,648,440 | 3/1972 | Egan | 261/DIG. 54 |
| 3,668,835 | 6/1972 | Vicard | 261/DIG. 54 |
| 3,959,420 | 5/1976 | Geddes et al. | 261/DIG. 54 |
| 4,015,957 | 4/1977 | Grantham | 261/DIG. 54 |
| 4,123,238 | 10/1978 | Hegeman | 261/DIG. 54 |

FOREIGN PATENT DOCUMENTS

1157585 11/1963 Fed. Rep. of Germany ... 261/DIG. 54

Primary Examiner—Richard L. Chiesa
Attorney, Agent, or Firm—Seidel, Gonda, Goldhammer & Abbott

[57] ABSTRACT

In a dip-type cooler for cooling and washing flowing dust-laden hot gas, having a venturi passage which opens in a container with washing fluid therein, the edge of a feed pipe for feed of gas into the cooler, the edge of a protective tube surrounding the feed pipe and the upper edge of the venturi passage, are of such a configuration and arrangement that the diameter of the protective tube is between the diameter of the feed pipe and that of the intake of the venturi passage and the lower boundary edge of the protective tube terminates beneath the lower edge of the feed pipe and beneath the upper edge of the venturi passage, whereby wetting fluid and dust in the gas come into contact with each other in a region spaced from wall surfaces within the cooler, to avoid the formation of caked-on deposits within the cooler.

7 Claims, 1 Drawing Figure

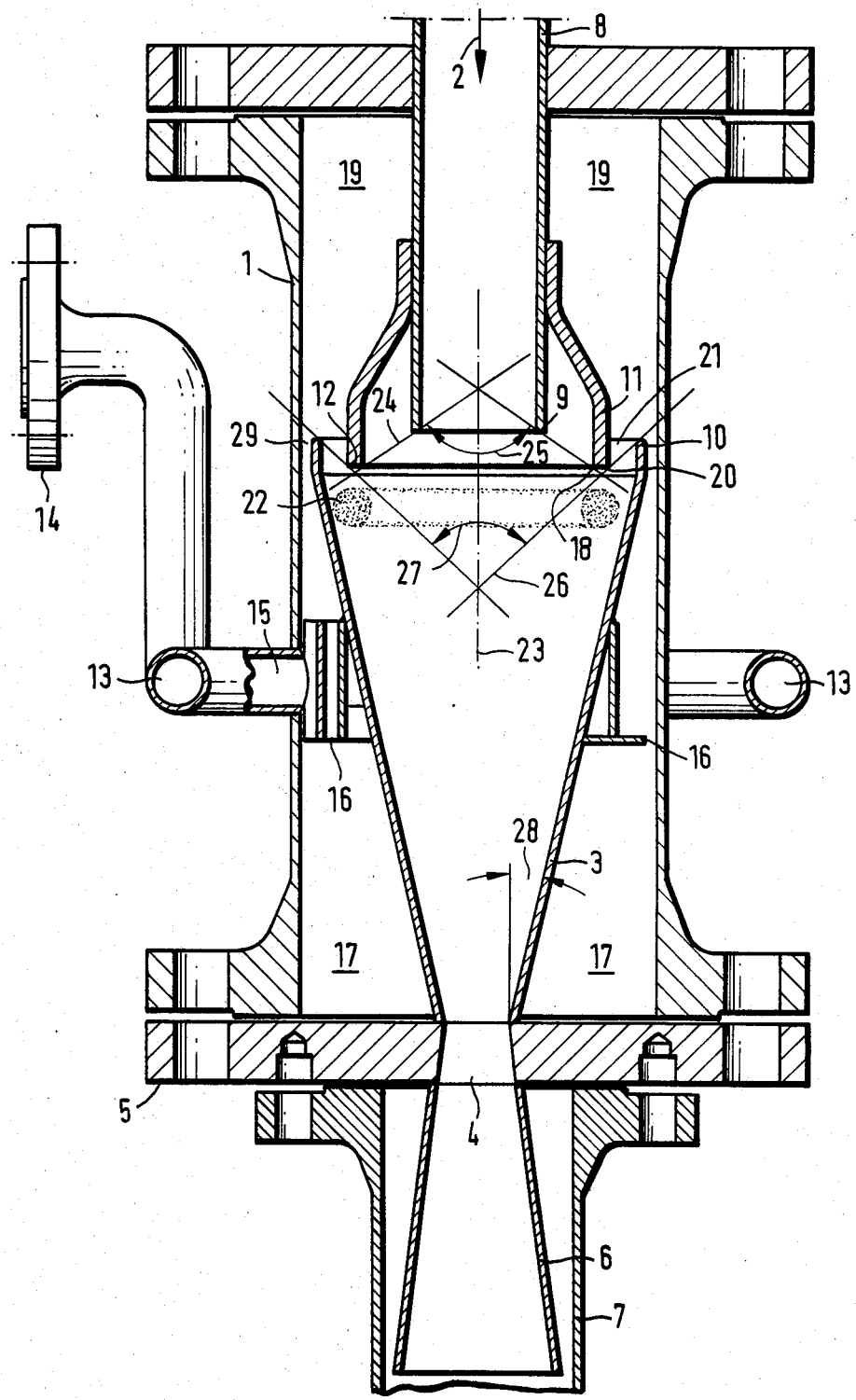

GAS COOLING AND WASHING APPARATUS

BACKGROUND OF THE INVENTION

The present invention relates generally to a gas cooling and washing apparatus and more particular a dip-type or immersion cooler for cooling and washing for example dust-laden hot gas which is flowing possible under an elevated pressure.

A dip-type or immersion cooler for cooling and washing a dust-laden flowing gas is disclosed for example in German published application (DE-AS) No. 11 57 585, comprising a dip pipe which has a fluid-wetted coaxial venturi passage and which extends vertically into a container with washing fluid, with a coaxial gas feed pipe at the intake of the venturi passage and a protective tube concentrically surrounding the gas feed pipe in the region of the intake. That arrangement has an overflow channel for the supply of washing fluid to the venturi tube, the intake portion of the venturi tube corresponding to a funnel member which is open in an upward direction. The walls of the intake portion are wetted by a thin film of fluid without any gap therein. To provide the flow of scrubbing fluid into the mouth of the intake portion of the venturi tube, the edge of the intake portion is surrounded by the above-mentioned overflow channel in which the washing fluid, being in that case water, flows in a pressure-less condition. The fluid thus passes in the form of a thin layer over the edge of the channel and into the intake portion. The venturi tube is disposed vertically and the gas to be washed or scrubbed flows downwardly therethrough, the mouth or diffuser of the venturi tube terminating in a separation chamber which is filled with the washing fluid. The gas that flows down into the washing fluid through the venturi tube is distributed in the fluid and issues therefrom, subsequently to be sucked away in the upper part of the chamber by way of gas outlet connections. As the dust-laden gas passes through the washing fluid, the dust is removed from the gas which is cooled at the same time. The dust is deposited on the bottom of the separation chamber and can thus be removed therefrom.

The inlet opening for the gas in the above-described apparatus is in the form of a tubular connecting member which terminates at the axial height of the upper edge of the intake portion of the venturi tube. At the same time, the tubular connecting member is surrounded concentrically by a protective tube which corresponds in diameter to the diameter of the upper edge of the intake portion of the venturi tube while its edge is only spaced from said edge of the intake portion of the venturi tube in such a way as to form a gap or slit, so that the wetting fluid can pass therethrough from the overflow channel and can cover the intake portion of the venturi tube. The conical or funnel-like configuration of the intake portion of the venturi tube provides at the same time that the wall or veil of washing fluid which, being directed downwardly, is accelerated by the force of gravity, can wet the intake portion without leaving any gaps in the film of fluid because, as a result of the conical configuration of the intake portion, the respective surface portions to be wetted by the fluid become progressively smaller in proportion to increasing depth of penetration of the wetting fluid down into the intake portion.

However, operating experience with the above-discussed venturi-type washer or scrubber has shown that, when handling hot gases, the hot gases tend to form caked-on deposits on the walls of the dip pipe or venturi tube, where they come into contact with the washing or wetting fluid. Such deposits are often found to grow very quickly so that the apparatus has to be taken out of operation and cleaned after short periods of operation, with the result that the apparatus is not suitable for washing and cooling dust-laden gas at elevated temperature.

SUMMARY OF THE INVENTION

An object of the present invention is to provide a dip-type cooler which is also suitable for cooling and washing dust-laden gas at high temperature.

Another object of the present invention is to provide a dip-type cooler for cooling and washing a dust-laden hot gas so designed as to minimise the danger of caked-on deposits of material being formed within the apparatus.

Still another object of the invention is to provide a dip-type cooler for cooling and washing dust-laden flowing hot gas of such a configuration that contact between the gas and the washing fluid does not occur in the direct vicinity of a wall surface within the apparatus.

These and other objects are achieved by a dip-type cooler comprising a dip pipe which in use of the apparatus extends substantially vertically and dips into washing fluid in a container. A venturi passage is disposed coaxially in the pipe, and the interior thereof is wetted with washing fluid. A gas feed pipe is disposed at the intake of the venturi passage substantially coaxially therewith to feed gas into the venturi passage while a protective tube is disposed substantially concentrically around the feed pipe in the region of the venturi intake. The transverse dimension or diameter of the protective tube, at its end towards the venturi passage, is between the corresponding dimension of the mouth of the feed pipe at its end towards the venturi passage and the corresponding dimension of the inlet opening of the venturi passage, while the lower boundary edge of the protective tube is below the lower edge of the feed pipe and also below the upper edge of the venturi passage.

As will become clearly apparent hereinafter, a construction as set forth above provides such a relative arrangement of the protective tybe, the gas feed pipe and the venturi passage that in operation of the apparatus the gas and the fluid meet at locations which are disposed at sufficient distance from a wall, for example that of the venturi passage, to prevent the formation of caked-on deposits thereon. More particularly, in a preferred embodiment the arrangement may be such that, when the intake portion of the venturi passage is of a slender configuration, the adjacent edge of the gas feed pipe, in combination with the adjoining edge of the protective tube, circumscribe the surface of a first imaginary cone and the edge of the protective tube, in combination with the edge of the intake portion, circumscribe the surface of a second imaginary cone, wherein the resulting cone angles are of an approximately equal size which is approximately twice that of the intake portion.

It should be appreciated that, when the gas which is supplied under pressure to the apparatus issues from the feed connection into the interior of the apparatus, the gas expands and spreads out as it leaves the connection at an angle of about 45°. The protective tube ensures that gas but in particular the dust entrained therewith cannot pass into the space in the dip pipe in which the feed of washing fluid thereinto occurs. However, the gas is not always uniform in its feed flow but on the contrary, the pressure of the gas may momentarily fluctuate so that pressure peaks occur. However, pressure peaks of that kind have the result that the washing fluid doesnot flow uniformly over the edge of the intake portion and thus into the venturi tube, but splashes or spatters of fluid into the venturi passage occur. If now particles of dust in the hot gas and splashes or spatters of the washing fluid were to meet at the wall of the venturi tube, caked-on deposits would be formed at that point, and they would grow very quickly.

As indicated above, the formation of the caked-on deposits can be effectively prevented by the lower edge of the protective tube being extended over a quite specific axial distance into the intake of the venturi passage. Thus, as stated above, the axial distance by which the edge of the protective tube extends into the intake of the venturi passage may be defined by the first imaginary cone which is described over the edge of the feed pipe or connection for the gas and the edge of the protective tube and the apex angle of which is from about 100° to 110°, preferably 108°. The second imaginary cone referred to above, which is inverted in relation to the first cone,can then be defined by the edge of the protective tube and the upper edge of the intake portion of the venturi tube, the second cone being of substantially the same size as the first cone and its apex angle also being between 100° and 110°, preferably about 102°.

Because, as will be appreciated, the cone angle of the intake portion of the venturi tube also plays a part in the above-indicated cone geometry, the arrangement may be such that the angles which are defined by the edges of the adjacent components, namely the feed connection for the gas, the protective tube thereof and the intake of the venturi tube, are approximately twice the cone angle of the slender venturi tube which is for example 52° in a practical construction of the apparatus. The above-indicated arrangement means that dust, gas and scrubbing fluid such as water can only come into contact with each other at those locations which do not afford them any possibility of forming caked-on deposits on the wall surfaces of the apparatus. As a result of that arrangement, the area of contact between the dust, gas and fluid is displaced into a region in the vicinity of the edge of the protective tube. Consequently, splashes or spatters of wetting fluid for the venturi tube, which occur as a result of fluctuations in the pressure of the gas at the overflow edge of the intake portion of the venturi tube and which drop down into the venturi tube impinge on to the flowing gas and thus the dust entrained therewith, in an annular region which is disposed somewhat below the lower edge of the protective tube and which is at a sufficient spacing from the wall of the intake portion of the venturi tube itself. After the dust and the water have once come into contact with wall surface, they no longer form any caked-on deposits.

In another preferred feature of the invention, the overflow edge of the intake portion of the venturi tube may be rounded off in order to produce a laminar flow which is of maximum unformity and regularity in the intake portion of the venturi tube. Sufficient rounding of that edge also acts to oppose the formation of splashes or spatters of fluid which may come out of the fluid when flowing over the edge, as a result of the fluctuations in the pressure of the gas.

Further objects, features and advantages of the invention will be apparent from the following description of a preferred embodiment of an apparatus in accordance with the invention.

BRIEF DESCRIPTION OF THE DRAWING

The accompanying single FIGURE is a view in longitudinal section and in simplified form of part of the apparatus illustrating the upper part of the dip pipe of the cooler.

DESCRIPTION OF THE PREFERRED EMBODIMENT

Referring to the drawing, the apparatus comprises an at least substantially vertically extending dip pipe 1 and, disposed substantially coaxially therewithin, an intake portion 3 of a venturi tube. A central bore 4 in a flange 5 forms the narrowest part of the venturi tube. Disposed adjoining same and below it in the drawing is a diffuser 6 which is thus disposed in a lower part 7 of the pipe 1.

A feed connection or pipe 8 for gas 2 to be cooled and washed opens from above into the pipe 1, with the lower edge 9 of the feed pipe 8 terminating at the same axial level as the upper edge 10 of the intake of the venturi tube. The feed pipe 8 is surrounded by a coaxially disposed protective tube 11 whose lower edge extends in the axial direction into the intake portion 3 of the venturi tube, to a position beneath the upper edge 10. The tube 11, as illustrated, is of a downwardly flowing configuration.

Disposed around the outside of the pipe 1 at a position spaced downwardly from the level of the edge 10 of the venturi tube is a ring main or conduit 13 which is supplied with washing or wetting fluid by way of a flange connection 14. The conduit 13 has discharge openings 15 for the fluid, the openings 15 being distributed at a plurality of locations around the periphery of the pipe 1. Associated with each of the openings 15 are respective baffle plates 16 which are fixedly connected, for example by welding, to the outside wall of the intake portion 3, and provide that the flow of fluid passing into an outer funnel space 17 within the pipe 1 is stablised or quieted and performs exclusively a movement in the peripheral direction, that is to say, around the funnel configuration of the intake portion 3. The fluid passes out of the space 17 up over the edge 10 of the intake portion 3 of the venturi tube and flows down the inside wall surface of the venturi tube, in the form of a closed laminar film with a tangential speed component (not shown), to the narrowest part 4 of the venturi tube. The closed laminar film is produced by the fluid, for example water, being caused to issue from an annular gap or slit 29 between the wall of the pipe 1 and the edge 10, for example at speeds of preferably $\leq 0.4$ meter/second.

The hot dust-laden gas 2 which, possibly under elevated pressure, flows into the arrangement through the connection 8, after passing the edge 9, expands in a conical configuration towards all sides. Such expansion of the gas is restricted however by the lower edge 12 of the protective tube 11 and in particular by the inner corner configuration or edge line 18 thereof. The gas 2 may not be uniform and regular in its feed flow but on the contrary may be subject to pressure surges. The latter result in fluctuations in pressure which also have an effect in the upper annular space 19 of the pipe 1 and which cause the fluid which flows over the edge 10 to form splashes or spatters which drop down in the form of drops at the outer edge 20 or in the annular gap 21 between the upper edge 10 of the venturi tube portion 3 and the lower edge 12 of the tube 11. When that occurs, they impinge on the gas 2 in an annular region as indicated at 22 which is spaced from the wall of the intake portion 3 on the one hand and the lower edge 12 of the tube 11 on the other hand, by a distance which is sufficient to ensure that, when particles of dust contained in the gas mix with droplets of the wetting fluid, they do not simultaneously come into contact with the edge 12 and the inner wall surface of the intake portion 3. Thus, caked-on deposits are prevented from forming at the edge 12 or at the inner wall surface of the intake portion 3.

The edges 9, 12 and 10 of the feed connection 8 and the protective tube 11 as well as the intake portion 3 of the venturi tube are disposed at given axial spacings from each other along the longitudinal axis of the pipe 1 as indicated at 23. It will also be seen that the transverse dimension (being the diameter in the case of components of round section) of the tube 11 at its downstream end 12 is between the diameter of the mouth of the gas feed pipe 8 and the diameter of the inlet opening of the venturi passage, with the boundary edge 12 of the tube 11 below the lower edge of the pipe or connection 8 and below the upper edge of the venturi passage.

Thus, the edge 9 of the feed connection 8, in combination with the inner edge 18 of the edge portion of the protective tube 11, forms a first imaginary cone as indicated at 24, with the apex thereof facing upwardly. The angle 25 of that cone is between 100° and 110° and is preferably 108°. In the same manner, the outer edge 20 of the tube 11, in combination with the edge 10, forms a second cone as indicated at 26 whose apex faces downwardly and whose apex angle 27 is approximately the same as the angle 25, being between 100° and 110°, and is preferably 102°. When the intake portion 3 is of a slender configuration, as in the illustrated embodiment, half the cone angle 28 of the intake portion 3 is betwen 25° and 30°, preferably 26°.

The lower part 7 of the pipe 1 is extended further downwardly and terminates below the level of water in a washing container into which the gas 2 is conducted. The gas is then removed from that container in a similar manner as in the case of the above-described prior apparatus. The above-described arrangement of the edges of the feed connection 8, the tube 11 and the intake portion 3 provides that dust-laden hot gas and particles of fluid no longer come into contact with each other in the direct vicinity of one of the walls of the fitments of the dip pipe 1 so that caked-on deposits which would cause the cooler to be taken out of operation will no longer occur in the vicinity of such locations of contact between the gas and the fluid.

It will be apreciated that the above-described construction was only given by way of example and that various modifications may be made therein without departing from the spirit and scope of the invention.

What is claimed is:

1. A dip-type cooler for cooling and washing flowing dust-laden hot gas, comprising a dip pipe which is adapted to extend at least substantially vertically into a container for washing fluid, a venturi passage disposed substantially coaxially in the dip pipe, means for wetting the venturi passage with fluid, a gas feed pipe at the intake of the venturi passage and substantially coaxial therewith, for feeding the gas into the venturi passage, and a protective tube disposed substantially concentrically around the gas feed pipe in the region of the intake and having a first end towards said venturi passage, the transverse dimension of the protective tube at its said first end being between the transverse dimension of the mouth of the gas feed pipe at its end towards the venturi passage and the transverse dimension of the inlet opening of the venturi passage, the lower boundary edge of the protective tube being disposed below the lower edge of the gas feed pipe and below the upper edge of the venturi passage, and the lower edge of the protective tube being spaced inwardly from the venturi passage.

2. A cooler as set forth in claim 1 wherein said lower edge of the gas feed pipe, with the inner line of the lower edge of the protective tube, define the surface of a first imaginary cone, and the outer line of the lower edge of the protective tube, with the edge of the intake of the venturi passage, define the surface of a second imaginary cone, the cone angles of said cones being of approximately equal size and each being approximately twice the cone angle of the venturi passage.

3. A cooler as set forth in claim 2 wherein said cone angle of said first cone is slightly larger than the cone angle of said second cone.

4. A cooler as set forth in claim 2 wherein the cone angles of said first and second cones are between 100° and 110°.

5. A cooler as set forth in claim 4 wherein the cone angle of said first cone is 108° and the cone angle of said second cone is 102°.

6. A cooler as set forth in claim 1 wherein at least the edge of the intake of the venturi passage is rounded off with a radius.

7. A dip-type cooler for cooling and washing dust-laden hot gas, comprising a dip pipe which has first and second ends and which is arranged to extend at least substantially vertically with its second end dipping into a washing fluid container, a venturi passage disposed in substantially coaxial relationship within the dip pipe, a gas feed means disposed at the first end of said dip pipe and extending into said dip pipe in at least substantially coaxial relationship towards said venturi passage, means for wetting the interior of the venturi passage with fluid to wash gas flowing therethrough, and a tubular protection means disposed in substantially concentric relationship around the gas feed means in the region of said venturi passage intake and having a first end around said gas feed means and a second end towards said venturi passage, the diameter of the tubular protection means at said second end thereof being between the diameter of the mouth opening of said gas feed means and the end thereof towards said venturi passage and the diameter of the opening of the intake of said venturi passage, the lower boundary edge of said tubular protection means being disposed in relation to the flow of gas through the dip pipe downstream of the downstream edge of the gas feed means and downstream of the upstream edge of the intake of the venturi passage, and the second end of the tubular protection means being spaced inwardly from the venturi passage.

* * * * *